(12) United States Patent
Rangappagowda et al.

(10) Patent No.: US 10,892,976 B2
(45) Date of Patent: Jan. 12, 2021

(54) METHODS, SYSTEMS, AND COMPUTER READABLE MEDIA FOR INTELLIGENT NETWORK TOPOLOGY MAPPING

(71) Applicant: Keysight Technologies, Inc., Minneapolis, MN (US)

(72) Inventors: Madhu Hosakoppa Rangappagowda, Cary, NC (US); Florin Ciodaru, Chapel Hill, NC (US); Nicolas Ribault, Issy les Moulineaux (FR)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 441 days.

(21) Appl. No.: 15/792,711

(22) Filed: Oct. 24, 2017

(65) Prior Publication Data
US 2019/0123993 A1    Apr. 25, 2019

(51) Int. Cl.
| H04L 12/751 | (2013.01) |
| --- | --- |
| H04L 12/24 | (2006.01) |
| H04L 12/721 | (2013.01) |
| H04L 12/26 | (2006.01) |
| H04L 12/733 | (2013.01) |
| H04L 12/851 | (2013.01) |
| H04L 12/803 | (2013.01) |

(52) U.S. Cl.
CPC .............. *H04L 45/02* (2013.01); *H04L 41/12* (2013.01); *H04L 43/10* (2013.01); *H04L 43/12* (2013.01); *H04L 45/20* (2013.01); *H04L 45/26* (2013.01); *H04L 47/125* (2013.01); *H04L 47/2441* (2013.01); *H04L 41/0853* (2013.01); *H04L 43/026* (2013.01); *H04L 43/50* (2013.01)

(58) Field of Classification Search
None
See application file for complete search history.

(56) References Cited

U.S. PATENT DOCUMENTS

| 6,377,987 | B1 | 4/2002 | Kracht |
| --- | --- | --- | --- |
| 7,260,645 | B2 | 8/2007 | Bays |
| 7,263,552 | B2 | 8/2007 | Govindarajan et al. |
| 7,426,577 | B2 | 9/2008 | Bardzil et al. |
| 7,584,298 | B2 * | 9/2009 | Klinker ................... H04L 43/00 370/229 |

(Continued)

OTHER PUBLICATIONS

Orebaugh et al., "Introducing Nmap," Chapter 2, Nmap in the Enterprise, 1st Edition, Syngress, pp. 33-62 (2008).

*Primary Examiner* — Gregory B Sefcheck
*Assistant Examiner* — Srinivasa R Reddivalam

(57) ABSTRACT

A method for intelligent network topology mapping includes identifying network paths between a source and a destination, wherein identifying the network paths includes, for a hop in network topology: selecting a number of probe packets for revealing an expected number of next hops reachable from the hop; maintaining a list of flows reaching the hop; selecting, from the list, flow parameters for each of the probe packets; generating the number of probe packets and including the selected flow parameters in the probe packets; transmitting the number of probe packets to the hop; receiving responses to the probe packets; and recording network addresses of next hops revealed by the responses. The method further includes generating, from the network addresses of next hops, a network topology map illustrating the network paths.

21 Claims, 7 Drawing Sheets

(56) References Cited

U.S. PATENT DOCUMENTS

| | | | |
|---|---|---|---|
| 7,769,850 B2 | 8/2010 | Silverman | |
| 7,821,966 B2 | 10/2010 | Beygelzimer et al. | |
| 8,254,388 B2 | 8/2012 | Kikuchi et al. | |
| 2002/0143905 A1* | 10/2002 | Govindarajan | H04L 41/0213 709/220 |
| 2012/0287791 A1* | 11/2012 | Xi | H04L 43/10 370/237 |
| 2015/0244617 A1* | 8/2015 | Nakil | H04L 41/0631 709/224 |
| 2015/0381459 A1* | 12/2015 | Xiao | H04L 41/12 370/253 |
| 2017/0026262 A1* | 1/2017 | Lad | H04L 43/045 |
| 2017/0195209 A1* | 7/2017 | Singh | H04L 67/322 |
| 2018/0227209 A1* | 8/2018 | Lin | H04L 45/38 |
| 2019/0280941 A1* | 9/2019 | Barnes | H04L 47/286 |

\* cited by examiner

METHODS, SYSTEMS, AND COMPUTER READABLE MEDIA FOR INTELLIGENT NETWORK TOPOLOGY MAPPING

TECHNICAL FIELD

The subject matter described herein relates to network topology mapping. More particularly, the subject matter described herein relates to methods, systems, and computer readable media for intelligent network topology mapping in networks that implement flow-based load balancing between a source and a destination.

BACKGROUND

Network topology mapping is the process of identifying paths between a source and a destination in a network. Network protocols implemented by Internet protocol (IP) routers allow such paths to be mapped. For example, IP routers implement the Internet control message protocol (ICMP) to report problems with IP datagram delivery to a transmitting source. IP also uses a time to live (TTL) value in packet headers to prevent circular routes. Together, ICMP and the TTL value can be used for topology discovery. For example, a packet source can transmit an IP packet with a TTL value of 1 to a destination. The first router between the source and destination will receive the packet, decrement the TTL value to zero, and return an ICMP time exceeded message back to the packet source. The ICMP time exceeded message will indicate that the time to live count in the packet has been exceeded. To identify a path between the source and the destination, the packet source can increment the time to live value, retransmit the packet with the increased time to live value, and see if the packet reaches the destination or if another ICMP time exceeded message is received.

The use of increasing TTL values to identify a path between a packet source and destination is used by traceroute, which is a diagnostic tool implemented by computer operating systems to identify network topologies. For example, traceroute implemented by Windows® operating systems transmits ICMP echo request messages with increasing TTL values to a destination. When the TTL values are less than the number of hops to the destination, the intermediate routers between the source and the destination will return ICMP time exceeded messages. When the TTL value is sufficient for the echo request message to reach the destination, the destination returns an ICMP echo reply message.

The output of a diagnostic tool such as traceroute is a list of IP addresses identifying routers between a source and a destination. The output may also indicate the order of the routers (by hop number), and the delay in reaching each of the hops. While such information is useful, it does not provide a complete view of network topology. For example, because traceroute does not vary packet parameters other than the time to live in successive transmissions, successive iterations of traceroute for the same destination may yield the same path through the network, even when multiple paths exist between the source and destination. If the network implements load sharing or other mechanism that results in packets being routed differently, using traceroute alone could fail to discover some of the network paths.

Accordingly, there exists a need for methods, systems and computer readable media for intelligent network topology mapping.

SUMMARY

A method for intelligent network topology mapping includes identifying network paths between a source and a destination, wherein identifying the network paths includes, for a hop in network topology: selecting a number of probe packets for revealing an expected number of next hops reachable from the hop; maintaining a list of flows reaching the hop; selecting, from the list, flow parameters for each of the probe packets; generating the number of probe packets and including the selected flow parameters in the probe packets; transmitting the number of probe packets to the hop; receiving responses to the probe packets; and recording network addresses of next hops revealed by the responses. The method further includes generating, from the network addresses of next hops, a network topology map illustrating the network paths.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Methods, systems, and computer readable media for intelligent network topology mapping are disclosed. The methods and systems described herein can use probe packets to probe a network for flow-based load sharing by intelligently varying parameters in the probe packets such that network hops will receive packets associated with different flows, possibly triggering flow-based load sharing. The parameter values may be varied to cause network nodes to implement flow-based load sharing or other traffic forwarding characteristic that causes packets associated with different flows to be sent to different next hops. The number of probe packets can be selected based on an expected number of next hops of a given hop. The expected number of next hops may be iteratively increased until no more next hops are discovered at given hop.

Prior to describing intelligent network topology mapping in further detail, an overview of traceroute-based topology mapping will now be presented. As stated above, traceroute is a utility implemented by some computer operating systems that can be used to identify a communications path through a network. While there are variations in implementations of traceroute by different operating systems, the basic process involves the sending of a sequence of messages towards a target destination node, where successive messages include incrementally increased time-to-live (TTL) values. Each hop in the network through which a message passes decrements the TTL value. After decrementing the TTL value, if the value is zero, the receiving node returns an ICMP time exceeded message to the message originator. If the TTL value is non-zero, the receiving node forwards the message with the decremented TTL value to the next hop in the network.

Figure 1:
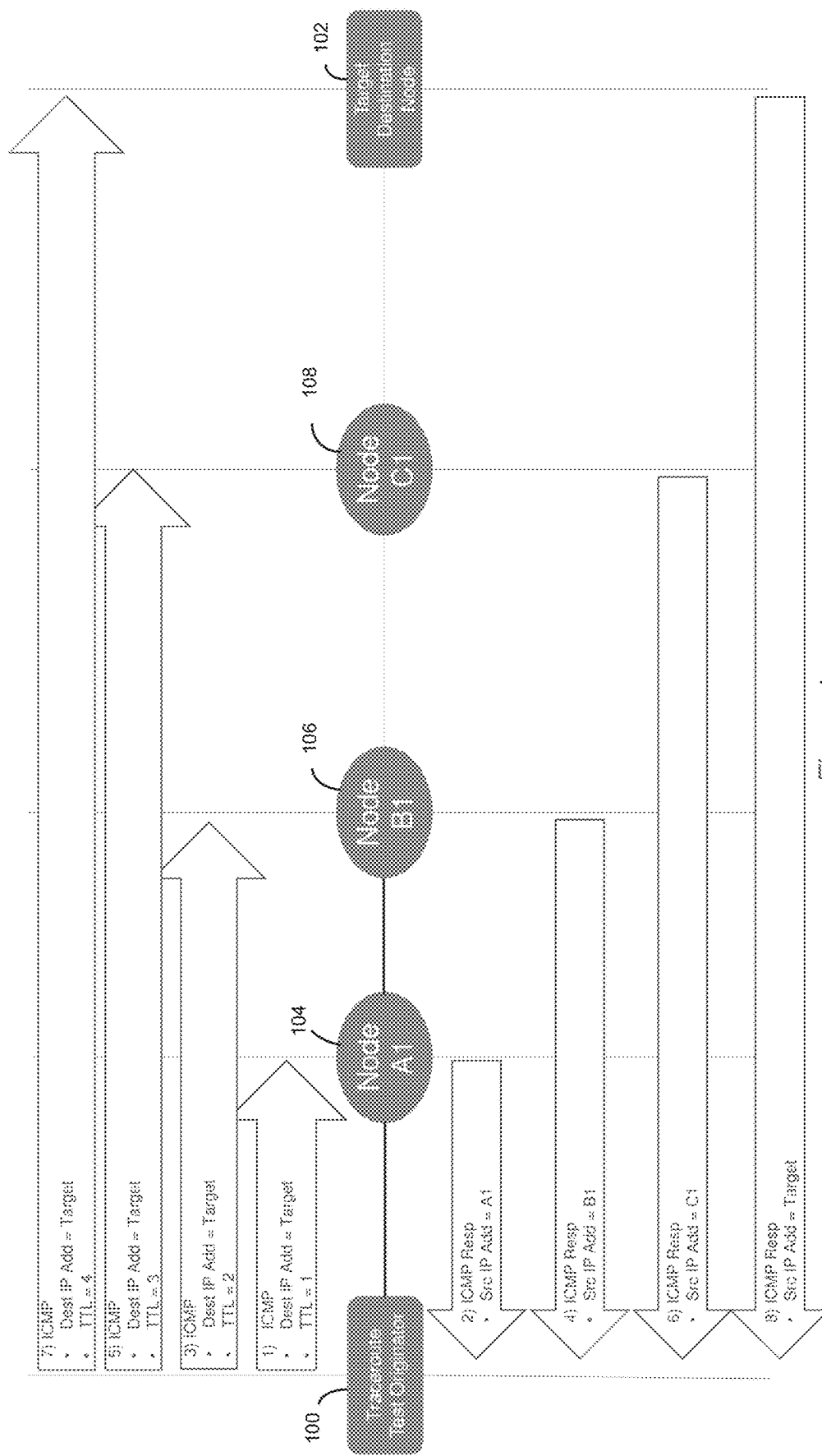
FIG. 1 is a message flow diagram illustrating traceroute-based topology mapping.

FIG. 1 is a network and message flow diagram where only one path exists between a traceroute test originator 100 and a destination node 102, and the path is through nodes A1 104, B1 106 and C1 108. In the traceroute test illustrated in FIG. 1, four request messages and four response messages are generated. The traceroute procedure ends when a response is received from the destination node. While traceroute accurately discovers the topology illustrated in FIG. 1, more complex topologies that implement load sharing and or other form of diversity in packet forwarding paths may not be discoverable using traceroute alone. For example, only varying the TTL value in successive packets may not trigger flow-based load balancing because traceroute packets from the traceroute utility on the same will not likely be interpreted as being associated with different flows.

Figure 2:
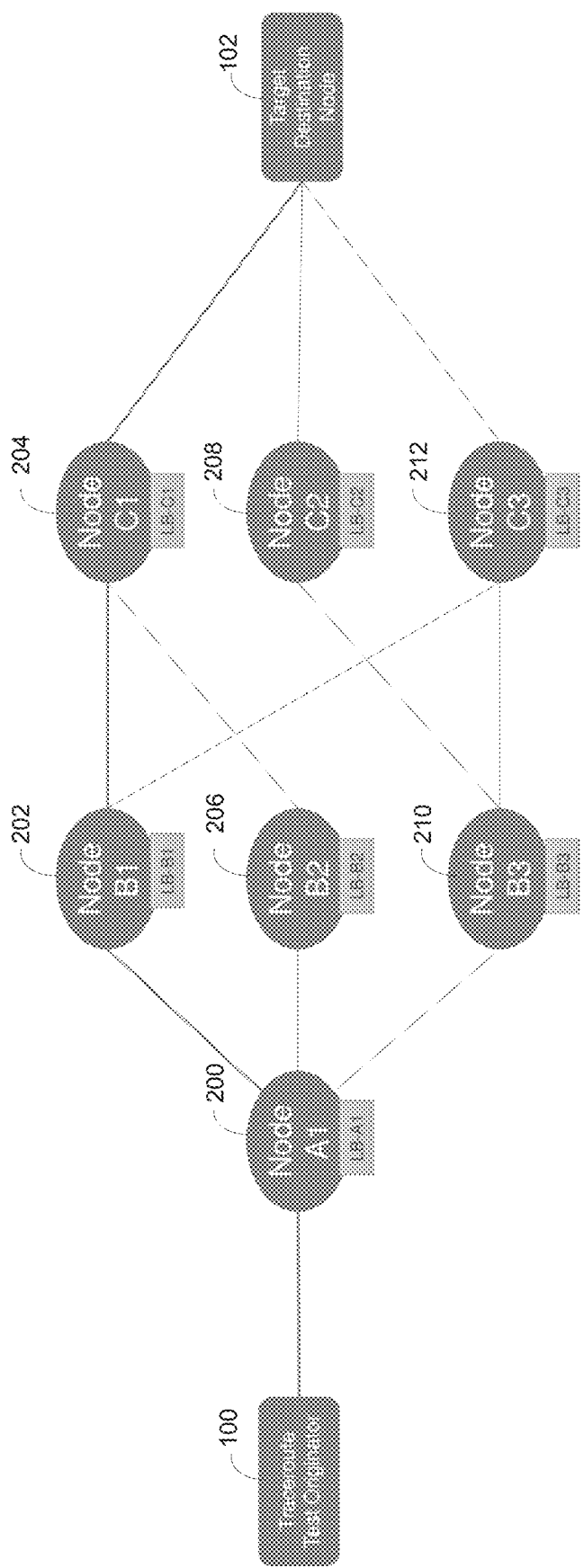
FIG. 2 is a network diagram illustrating a network that implements load sharing.

FIG. 2 is a network diagram illustrating a network topology that implements load sharing. In FIG. 2, one path between source node 100 and destination node 102 involves nodes 200, 202, and 204. However, because each node in the network may implement load sharing, nodes 206, 208, 210, and 212 may also be present in valid paths between source node 100 and destination node 102. If it is desired to construct a complete topology map of the network shown in FIG. 2, then a major challenge involves figuring out a way to efficiently exercise each and every available path, so that all nodes and paths can be detected.

There are two types of load sharing that are typically implemented by network nodes. One type, referred to as packet-based load sharing, involves each node making a per-packet load sharing decision where packets are load shared among next hop nodes regardless of whether the packets are associated with the same flow. Another load sharing algorithm, referred to as flow-based load sharing, involves load sharing flows among network paths, but once a flow is assigned to a path, packets associated with the same flow are assigned to the same path. A flow is a group of related packets transmitted between a source and a destination. Packets associated with the same flow may be identified by a set of packet parameters. In one example, these parameters include IP source address, source port, IP destination address, destination port and protocol. The subject matter described herein is directed to developing a map of network topology when the network implements flow-based load sharing.

At each hop in a network, flow-based load sharing examines parameters in each packet header to determine how the packet should be forwarded, but the load sharing algorithm is structured such that packets assigned to the same flow follow the same path. Using traceroute alone to discover a network topology will fail to detect flow-based load sharing because traceroute packets are not flow-based. Moreover, the traceroute test originator has no prior knowledge of either the actual network topology or the load sharing algorithms that are used by network nodes. In FIG. 2, if a test originator executes a traceroute test, a path to destination 102 through hops A1 200, B1 202 and C1 204 may be identified. However, it will be appreciated that in this case the test originator has only discovered one of 3 load shared egress paths associated with node A1 200, and only one of 2 load shared egress paths associated with node B1 202.

Figure 3:
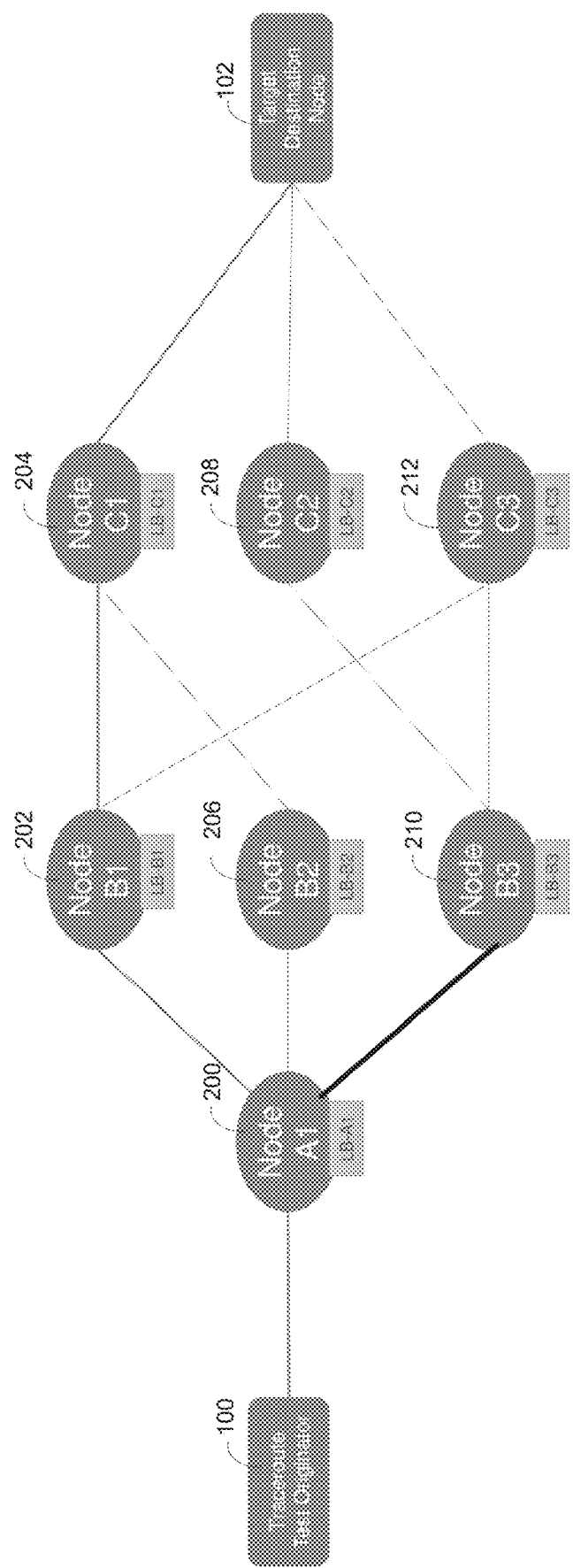
FIG. 3 is a network diagram illustrating a load shared path in the network illustrated in FIG. 2.

FIG. 3 illustrates the same network diagram as FIG. 2 except that one of the load shared paths from node A1 200 is indicated by the bold line between node A1 200 and node B3 210. The load sharing algorithm implemented at node A1 200 will only distribute across the available load shared paths if the packets include certain combinations of parameter values in the packet header. If a packet has one combination of header values, node A1 200 will select node B1 202 as the next hop. If a packet has a different combination of header values, node A1 200 will select node B3 210 as the next hop. If flow-based load sharing is implemented, node A1 200 will select the same next hop node B1 202 or node B3 210 for packets associated with the same flow.

One problem addressed by the subject matter described herein is how the probe packet originator can determine which combinations of packet parameter values to use in order to exercise each possible load shared path from a first hop to a destination node. Another problem addressed by the subject matter described herein is reducing the number of probe packets required to exercise potential load shared paths.

One possible solution to the problem of exercising potential load shared paths is to use a brute force approach where a traceroute test originator implements traceroute tests with all possible valid combinations of packet header values. However, traceroute is carried by IP, and the number of possible valid header parameter values in an IP packet would make such an approach impractical in terms of time, number of messages, and/or required computing power.

One aspect of the subject matter described herein includes a system for intelligently probing a network and determining available paths to a target destination. In one example, a network topology mapper uses an iterative approach where a list of flow-based packets that reach each hop in the network is maintained. Probe packets are generated at each hop to probe for one or more next hops. Flow parameters for the probe packets are selected from the flows that reach the current hop. The flow parameters in the outgoing probe packets are intelligently varied to probe for next hops reachable from the current hop. In another example, a network topology mapper probes nodes that are interposed between a test source agent and a target destination and determines information related to load sharing algorithms implemented by the intermediate nodes. The topology mapper then uses the information regarding the load sharing algorithms to narrow the number of combinations of packet header value combinations needed probe all possible network paths.

By reducing the number of possible packet parameter values used in probe packets, the topology mapper can significantly reduce the number of probe packets needed probe the network. For example, the topology mapper may send a first probe packet to a node in the network, which causes the node to drop the probe packet and respond to the topology mapper with a response packet that includes the IP address of the node. The topology mapper may use the IP address to perform a reverse domain name system (DNS) lookup to obtain domain name information for the sending node. The domain information returned by the reverse DNS lookup may then be used to implement port scanning to obtain, from the node, information that identifies the machine type and/or software version, i.e., Cisco Router Version X, Software Release Y. The information regarding the machine type and/or software version can be used to identify the load sharing algorithm used by the node. The load sharing algorithm can be used to select boundary conditions for variations in packet header parameter values used in subsequent probe packets. For example, if it is known that a particular router type uses flow-based load sharing based on source port, then the source port parameter may be varied randomly with the same combination of remaining IP header values until no new next hops are identified. Once no new next hops are identified, the TTL value in the packet is incremented, and the process is repeated for each identified next hop until no new next hops are identified. The process continues until the destination is reached.

Figure 4A:
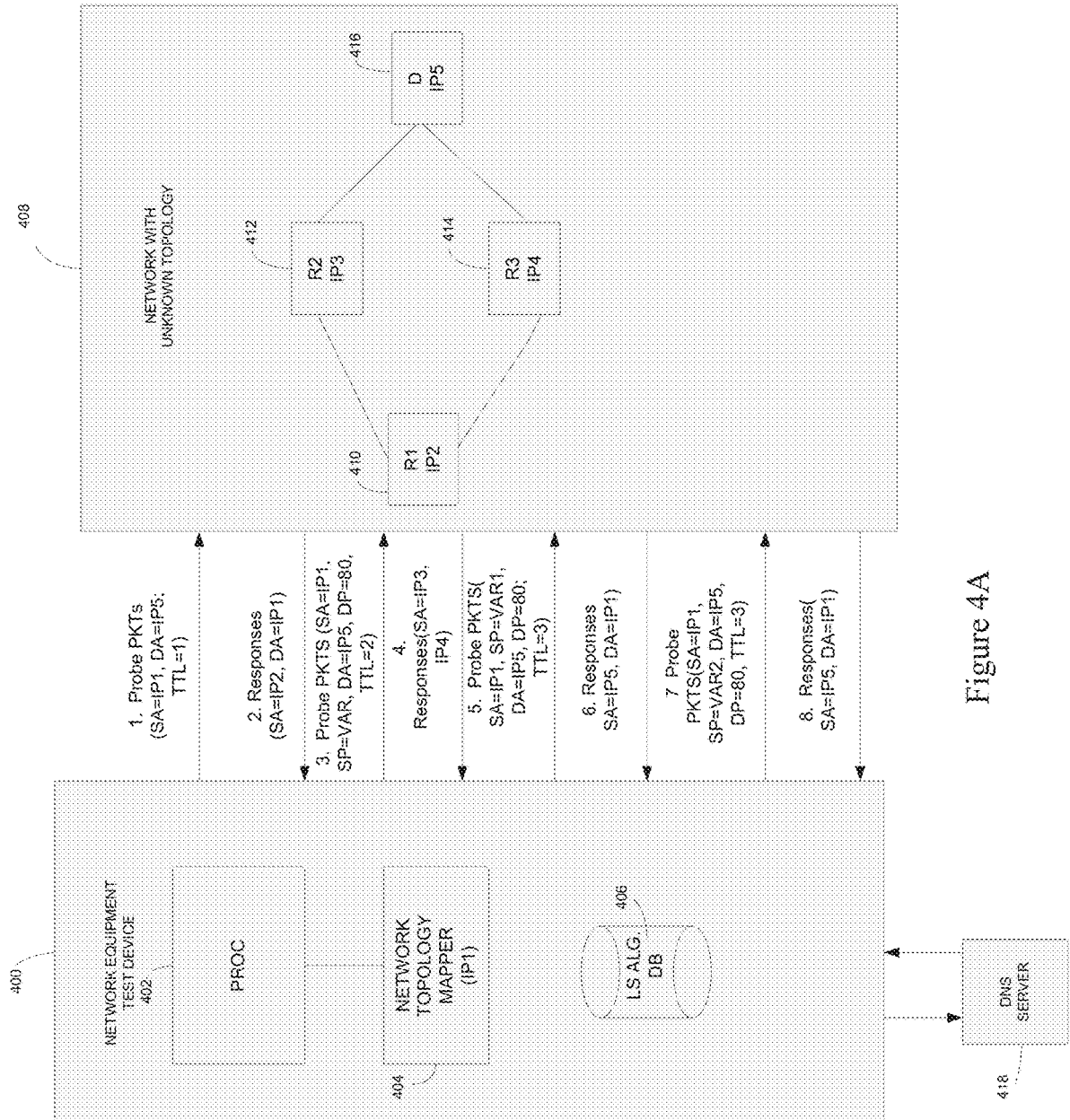
FIG. 4A is a block and message flow diagram illustrating intelligent network topology mapping.

FIG. 4A is a block and message flow diagram illustrating the system and a process for intelligent network topology mapping. In FIG. 4A, a network equipment test device 400 includes a processor 402, a network topology mapper 404, and a load sharing algorithm database 406. Network equipment test device 400 may be used to determine the topology of a network 408 with unknown topology and that possibly implements load sharing. In the illustrated example, network 408 includes routers 410, 412, and 414 and a destination host 416.

Referring to the message flow illustrated in FIG. 4A, network topology mapper 404 may start the topology mapping process by transmitting probe packets to the host IP address IP5 of destination 416. The probe packets may have a TTL value of 1 for probing the first hop in the network. The probe packets may be ICMP echo request packets or any other packet carried in an IP datagram. The number of probe packets selected with TTL=1 may be one or more than one.

In line 2 of the message flow diagram, network equipment test device 400 receives a response or responses from network 408. The response or responses may be ICMP time exceeded messages that are generated when the receiving router R1 410 decrements the TTL value in a received probe packet and the resulting TTL value is zero.

In line 3 of the message flow diagram, network topology mapper 404 generates and sends a number of probe packets with TTL values of 2 designed to probe of next hops reachable from router R1 410. To generate the probe packets, network topology mapper 404 selects from header values from packets associated with flows that reached router R1 410. In the illustrated example, since router R1 410 is the first hop in the network all flow packets transmitted from the source would reach router R1 410, so the flow parameters used to probe the number of next hops from router R1 410 may be selected from any of the probe packets transmitted to router R1 410. For subsequent hops, flow packets may be selected from a list of flow packets that reach each hop. The selections may be made such that flow parameters are intelligently varied across probe packets to present packets associated with different flows to a hop for the purpose of identifying next hops reachable from the hop using flow based load sharing.

Router R1 410 receives the probe packets with the TTL value of 2, decrements the TTL value, and selects an outbound interface for each of the probe packets. Because router R1 410 implements flow-based load sharing and some of the packets are associated with different flows, so of the packets will be forwarded to router R2 412, and some of the packets will be forwarded to router R3 414. Routers R2 412 and R3 414 receive the probe packets and decrement the time to live values. Because the time to live values in the probe packets are now zero, routers R2 412 and R3 414 do not forward the probe packets and instead generate responses to the sender of the probe packets.

In line 4 of the message flow diagram, the responses to the probe packets from routers R2 412 and R3 414 are received by network topology mapper 404. The responses from router R2 412 include the source address of router R2 412. The responses from router R3 414 include the source address of router R3 414. Network topology mapper 404 creates, for each hop R2 412 and R3 414 a list of packet flow parameters that caused each probe packet to reach each hop 412 and 414. These lists will be used to intelligently select flow parameters for subsequent packets transmitted routers R3 412 and R4 414 to identify outbound interfaces from router R3 412 and router R4 414.

In line 5 of the message flow diagram, network topology mapper 404 generates a number of probe packets and transmits the probe packets to R1 410. The probe packets have a time to live value of 3. Network topology mapper 404 may select flow parameters for the probe packets from flows whose parameters are stored in the list of flows for router R3 412. The flow parameters may be selected such that at least one parameter, such as the source port, varies across the probe packets. In FIG. 4A, these parameters are represented by SP (source port)=VAR1. Router R1 410 receives the probe packets, decrements the time to live values, and routes the probe packets to router R3 412. Router R3 412 receives the probe packets, decrements the time to live value in each of the probe packets, and routes the probe packets to destination 416. Because destination 416 is the destination to which the probe packets are addressed, destination 416 responds to the probe packets. In line 6 of the message flow diagram, network topology mapper 404 receives the response from destination 416 for the packets forwarded by router R3 412 and records the network address of destination 416 as the only next hop reachable from router R3 412.

In line 7 of the message flow diagram, network topology mapper 404 generates a number of probe packets and transmits the probe packets to R1 410. The probe packets have a time to live value of 3. Network topology mapper 404 may select flow parameters for the probe packets from flows whose parameters are stored in the list of flows for router R4 414. The flow parameters may be selected such that at least one parameter, such as the source port, varies across the probe packets. In FIG. 4A, these parameters are represented by SP (source port)=VAR2. Router R1 410 receives the probe packets, decrements the time to live values, and routes the probe packets to router R4 414. Router R4 414 receives the probe packets, decrements the time to live value in each of the probe packets, and routes the probe packets to destination 416. Because destination 416 is the destination to which the probe packets are addressed, destination 416 responds to the probe packets.

In line 8 of the message flow diagram, network topology mapper 404 receives the response from destination 416 for the packets forwarded by router R4 414 and records the network address of destination 416 as the only next hop reachable from router R4 414.

Figure 4B:
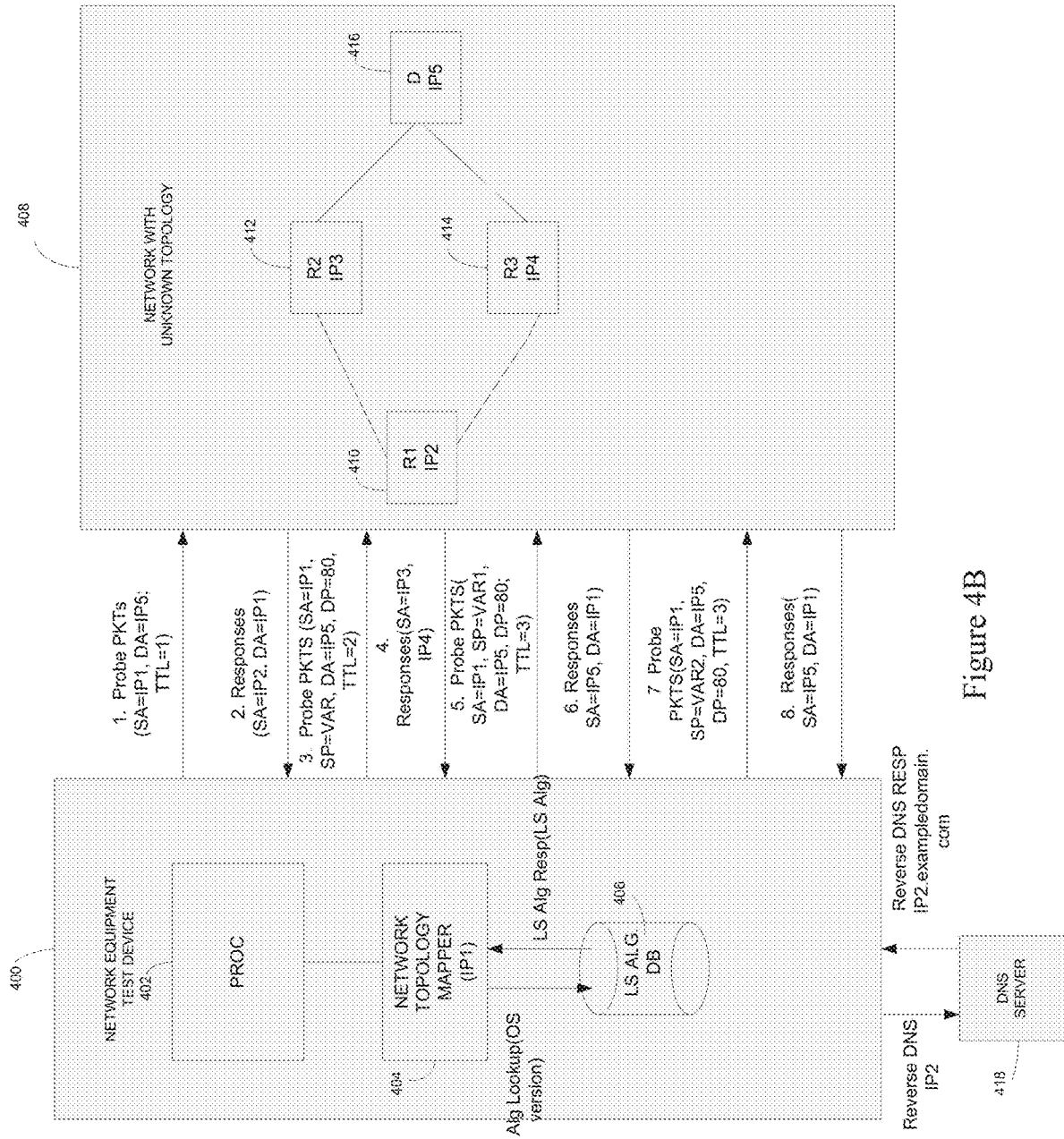
FIG. 4B is a block and message flow diagram illustrating an alternate method for intelligent network topology mapping.

In FIG. 4A, network topology mapper 404 builds and maintains a list of packet flows reaching each hop and uses that list to identify next hops reachable from each hop. The packet flow parameters are selected such that each hop is presented with packets from different packet flows. The flow parameters may be selected from the list such that flows that reach a certain hop are tested to see if they take different paths from the hop. Flows may be selected from the list without replacement so that different flows are forwarded from each hop. If the list of flows is empty for a given hop, probe packed parameters may be algorithmically generated, as will be described in more detail below. In an alternate implementation, knowledge about a packet forwarding characteristic, such as a load sharing algorithm, of a network hop may be identified, and the load sharing characteristic may be used intelligently vary the packet flow parameters. FIG. 4B illustrates such an embodiment. The message flow illustrated in FIG. 4B is the same as that illustrated in FIG. 4A except that in FIG. 4B, and IP address learned from a response to a probe packet is used to perform a reverse domain name system lookup by querying DNS server 418. The result of the reverse DNS lookup is a domain associated with the IP address. For example, for the IP address IP2, the reverse DNS lookup may yield IP2.exampledomain.com, where exampledomain.com is the domain of IP2. Network topology mapper 404 may use a utility, such as network mapper (nMap) with the switch—sV to identify open ports and operating system versions associated with the router with IP address IP2. The results of the nMap scan may be used to perform a lookup in load sharing algorithm database 406, which yields details about the load sharing algorithm used by the router with IP address IP2. The details about the load sharing algorithm may be used to intelligently vary the parameters in probe packets sent to the router with IP address IP2. For example, if the load sharing algorithm indicates that the router with IP address load shares packets differently based on odd and even source port values, then network topology mapper 404 may use this knowledge to intelligently select packet parameter values to include in the probe packets such that packets associated with different flows are routed differently by the router. Thus, knowledge about the load sharing algorithm may be used by a network hop may optionally be used to further refine intelligent parameter selection for probe packets.

Figure 5:
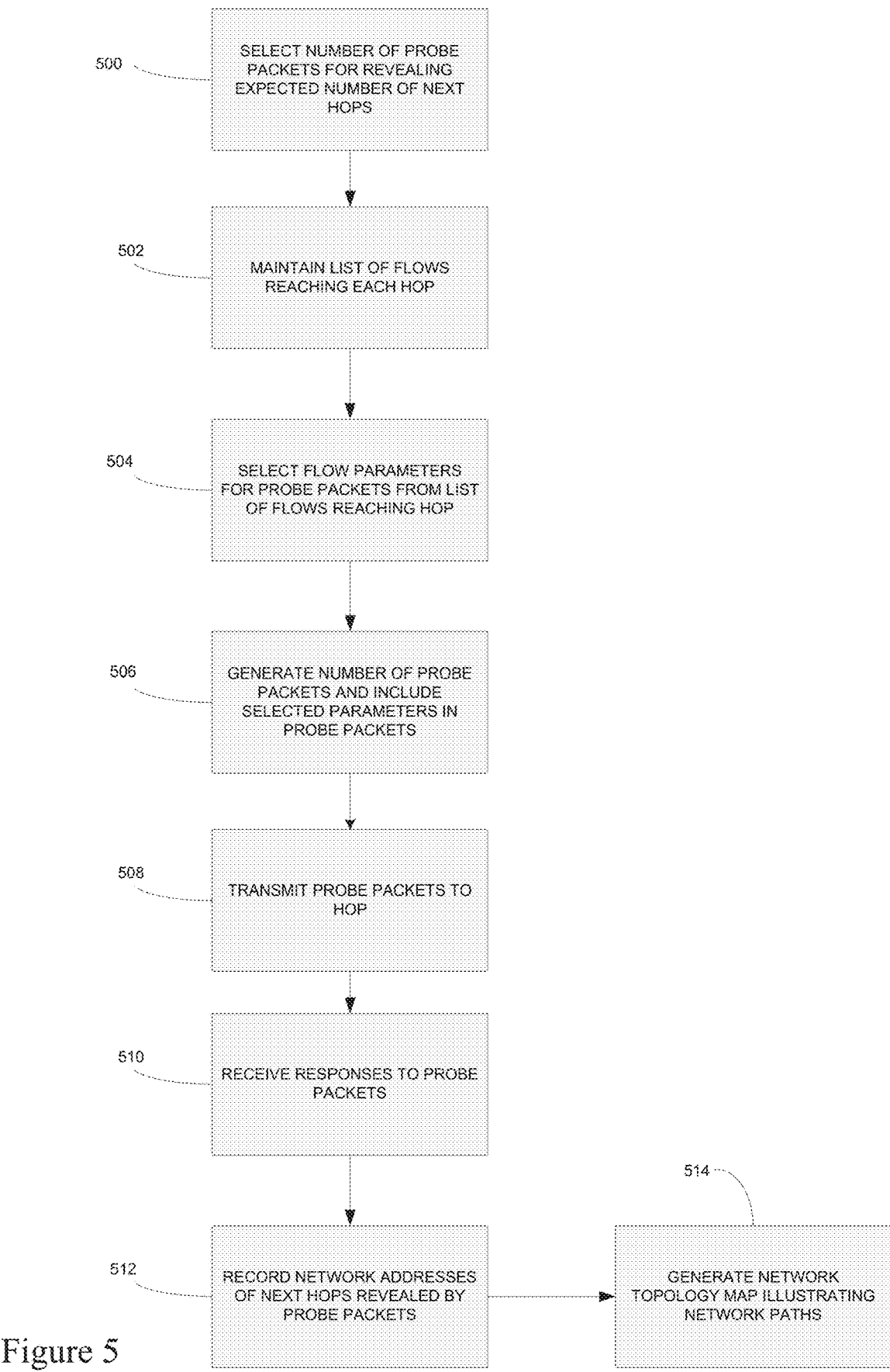
FIG. 5 is a flow chart illustrating an exemplary process for intelligent network topology mapping.

FIG. 5 is a flow chart illustrating an exemplary process for intelligent network topology mapping. The steps in FIG. 5 may be implemented by network topology mapper 404. Referring to FIG. 5, in step 500, for a hop in network topology, a number of probe packets for revealing an expected number of next hops reachable from the hop is selected. The selection may be made using a lookup table that maps the expected number of next hops to a number of required probe packets. The mappings in the table may be based on empirical data that indicates that x number of probe packets can detect y interfaces with a specified probability of certainty. Alternatively, an algorithm that maps the expected number of interfaces to the expected number of probe packets may be used.

In step 502, a list of flows reaching the hop is maintained. For example, the list may be built by transmitting probe packets to each hop and keeping track of the flows that reach each hop. Initially, before probe packets are transmitted to any of the hops, the list will be empty. As a probe packet reaches a given hop, network topology mapper 404 adds an entry to the list for that hop. Each entry includes flow parameters that are usable to identify the flow. In one example, the flow parameters include IP source address, source port, IP destination address, destination port, and protocol.

In step 504, flow parameters for each of the probe packets are selected from the list. As stated above, if the list is empty for a given hop, probe packet parameters will be algorithmically generated. However, if the list is non-empty for a given hop, parameters may be selected from packet parameters of flows that reached the hop.

In step 506, the number of probe packets is generated and the selected flow parameters are includes in the probe packets. For example, the number of probe packets selected in step 500 is generated. The expected number of next hops may be initialized to a default value, such as 2, which may map to a number of probe packets, such as 8. The packet parameters selected from the flows that successfully reached the hop may be varied such that packets associated with different flows are transmitted to the hop.

In step 508, the number of probe packets is transmitted to the hop. Continuing with the example in the preceding paragraph, if 8 probe packets are selected, 8 probe packets may be transmitted to the hop. The time to live values in the packets may be set to a value that is one greater than required to reach the current hop so that next hop interfaces of the current hop are discoverable. The hop receives the packets, decrements the TTL values, and forwards the packets to next hops of the current hop. The next hops receive the probe packets, decrement the TTL values, and respond to the packets, since the TTL values are now zero.

In step 510, responses to the probe packets are received. For example, network topology mapper 404 receives the responses from each next hop that received a probe packet and decremented the TTL value to zero.

In step 512, network addresses of next hops revealed by the responses are recorded. For example, network topology mapper 404 records the source network address of each next hop identified by the probe packets.

Figure 6:
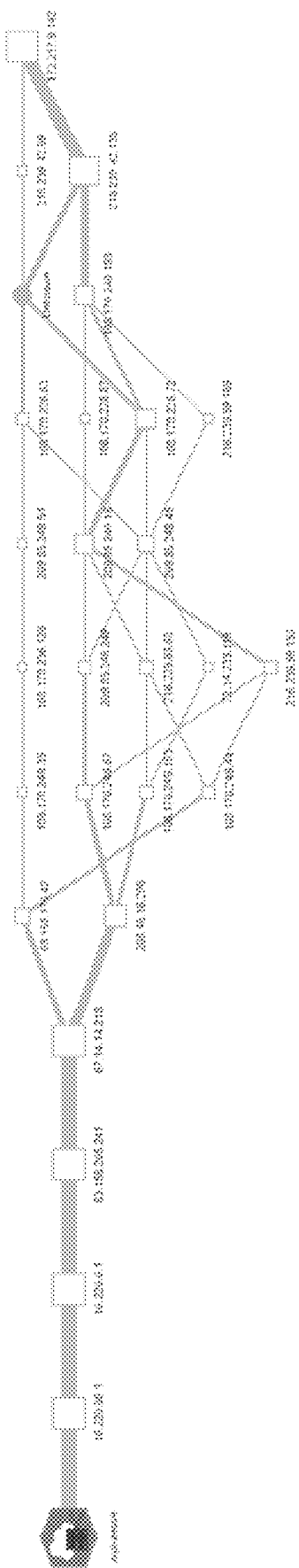
FIG. 6 is a network diagram illustrating an example of a network topology map generated using the intelligent methods and systems described herein.

In step 514, a network topology map illustrating network paths is generated. For example, network topology mapper 404 may generate a map of network hops between a source and destination showing links, including load shared links, between hops. An example of such a map is illustrated in FIG. 6.

The steps illustrated in FIG. 5 may be repeated for each hop in the network to identify next hops of each hop. In addition, for a given hop, the expected number of next hops and the corresponding number of probe packets may be incrementally increased and the steps may be repeated to discover new next hops of the current hop. The steps may be repeated for a given hop with increasing numbers of probe packets until no new next hops are discovered with a desired degree of confidence.

Thus, using the intelligent methods and systems described herein, the number of messages required to generate a network topology map is reduced over implementations that perform brute force probing using all valid IP header parameter value ranges. The reduction in messaging enables network topology maps to be efficiently generated without overwhelming the network with topology discovery traffic.

The intelligent network topology mapping methods and systems described herein are capable of generating network topology maps in networks that use load sharing, priority routing, or any other traffic forwarding characteristic that causes packets to take different paths to a destination. For example, returning to FIG. 4A, if it is determined that router R1 410 implements a quality of service (QoS) mechanism, rather than a load sharing mechanism, the probe packets in line 5 may be structured to invoke a high QoS path corresponding to router R2 412. The probe packets in line 7 may be structured with a QoS value or tag that causes router R1 410 to send the probe packet to a lower QoS path corresponding to router R3 414. Thus, the subject matter described herein is capable of tagging packets to trigger priority routing and mapping network topology based on the priority routing. Such tagging may be used to determine whether the network topology correctly implements a QoS mechanism specified in a service level agreement.

In addition to mapping the network topology, network topology mapper 404 may also determine and display performance metrics, such as packet loss, for each identified network hop. For example, in FIG. 4A, once the topology of network 408 is determined, network topology mapper 404 may ping each identified IP address repeatedly and report packet loss statistics for the identified IP addresses. In addition, network topology mapper 404 may repeatedly send probe packets designed to trigger the load sharing or QoS algorithm of each network hop and generate and display frequency data associated with the network paths over which packets travel. For example, if the path from router R1 410 to router R2 412 is used by 60% of the packets and the path from router R1 410 to router R3 414 is used by 40% of the packets, the relative frequency would be displayed on the links between router R1 410 and routers R2 412 and R3 414 in the network topology map.

In one implementation of the subject matter described herein, topology mapper 404 will make use of a stochastic algorithm that determines the number of probe packets to send on hop by hop basis to find all the next hops with a certain confidence level. In such an implementation, forwarding characteristics can be used to improve the confidence degree, but they are not mandatory. The following pseudo code illustrates and example of algorithms that may be used by network topology mapper 404 to generate the required number of probe packets.

---
Alg 1 - find paths between hops $h_{min}$ and $h_{max}$
---
$I_{h_{min} - 1} \leftarrow \{0\}$
for h in [$h_{min}$ + 1, $h_{max}$ + 1] do
   $I_h \leftarrow \emptyset$
   for i in $I_{h-1}$ do
      $N_i \leftarrow$ FindNextHops(i, h)
      $I_h \leftarrow I_h \cup N_i$
   endfor
endfor
where
h - represents a hop number (TTL value)
$I_h$ - represents the set of interfaces at hop h
$N_i$ - represents the set of next hops for i ---
Alg 2 - find the next hops (for hop h) of interface i
---
function FindNextHops(i, h)
   $N_i \leftarrow \emptyset$
   do
      m ← count($N_i$) + 1
      probes ← computeProbesCount(m)
      for k in [1, probes] do
         n ← Probe(k, h, i)
         $N_i \leftarrow N_i \cup \{n\}$
      endfor
   while count($N_i$) < m
endfunction Where the main components are
computeProbesCount(m)—determines the number of probes that need to be sent to reveal the specified number of interfaces. The number of probes may be determined by looking up the number of interfaces in a predefined table, for example, Table 1 below may be used.

TABLE 1

Expected Number of Interfaces to Number of Probe Packets Mappings

| M | 2 | 3 |
|---|---|---|
| Probes | 7 | 12 |

Alternatively, an algorithm may be used to map the expected number of interfaces to probe packets.
Probe(k, h, i)—builds and sends a probe packet
The function Probe(k, h, i) may work as follows
At each hop
   Build the packet
      Check if we have an available flow (a flow that already reached this hop)
      if yes
         mark the flow in use
         get the associated packet
      If no available flow found
         Generate and send new packets until one of them reaches the current hop—here a hash function may be used to get a new src_port that was not already used for previous flows. The implementation can be
         (15000+last_flow_id++) to map it to src_port range
         or get a random number that was not used already
   Update the TTL in the packet and send it
   When a reply arrives mark the corresponding flow as available so that it can be used again In the pseudo code example, algorithm 1 is the overall algorithm to find the number of hops between a source and a destination. Algorithm 2 finds the number of next hops for a given hop of an interface i from which the probe packets are sent. The function computeProbesCount(m) takes as input the expected number of interfaces (next hops) of a given hop. The function computeProbesCount(m) can be implemented using a lookup table or algorithm. The value of m can be incrementally increased until no new next hops are discovered for a given hop. The function Probe(k, h, i) builds the specified number of probe packets to test the next hops of a given interface i of a given hop h. The flow parameters for each probe packet are selected from flows reaching a given hop. The source port and/or sequence number may vary across the probe packets so that different flows are presented to the hop.

FIG. 6 is a diagram illustrating an example of a network topology map that may be generated by network topology mapper 404. In FIG. 6, the network topology map includes visual indications of nodes, network addresses of the nodes, and interconnections between nodes. The network topology map further indicates the relative frequencies of use of load shared paths. For example, thicker lines interconnecting the nodes in FIG. 6 indicate paths that are used more frequently. The network topology may also indicate a packet loss metric for at least some of the nodes. The packet loss metric may indicate a percentage of received packets that are dropped by each node. The packet loss metric is not illustrated in FIG. 6.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for intelligent network topology mapping, the method comprising:
identifying network paths between a source and a destination, wherein identifying the network paths includes:
for a hop in network topology:
selecting a number of probe packets for revealing an expected number of next hops reachable from the hop;
maintaining a list of flows reaching the hop;
selecting flow parameters for each of the probe packets, wherein selecting the flow parameters for each of the probe packets includes selecting at least some of the flow parameters from the list, obtaining machine type or software version information of the hop, using the machine type or software version information to identify a load sharing algorithm used by the hop, and using the load sharing algorithm to set boundary conditions for selecting the flow parameters for each of the probe packets;
generating the number of probe packets and including the selected flow parameters in the probe packets;
transmitting the number of probe packets to the hop;
receiving responses to the probe packets;
recording network addresses of next hops revealed by the responses; and generating, from the network addresses of next hops, a network topology map illustrating the network paths.

2. The method of claim 1 wherein selecting the number of probe packets includes performing a lookup in a table that maps the number of expected next hops to the number of probe packets.

3. The method of claim 1 comprising iteratively increasing the number of probe packets, generating and transmitting the increased number of probe packets to the hop, receiving responses to the increased number of probe packets, and recording network addresses of new next hops revealed by the increased number of probe packets.

4. The method of claim 1 wherein selecting the flow parameters includes selecting a combination of parameters that identifies a flow for each of the probe packets.

5. The method of claim 4 wherein the combination of parameters that identify a flow include source address, source port, destination address, destination port, and protocol.

6. The method of claim 4 wherein selecting the parameters that identify a flow for each of the parameters includes varying at least one of the parameters so that at least some of the probe packets are associated with different flows.

7. The method of claim 1 wherein selecting the flow parameters includes identifying a routing characteristic of the hop and selecting the flow parameters based on the routing characteristic of the hop.

8. The method of claim 1 comprising inserting a quality of service tag in the probe packets.

9. The method of claim 1 wherein the network topology map shows a relative frequency of use of the network paths.

10. The method of claim 1 wherein the network topology map shows a packet loss metric associated with the hops.

11. A system for intelligent network topology mapping, the system comprising: a network equipment test device including:
at least one processor; and
a network topology mapper implemented by the at least one processor for identifying network paths between a source and a destination, wherein identifying the network paths includes:
for a hop in network topology:
selecting a number of probe packets for revealing an expected number of next hops reachable from the hop;
maintaining a list of flows reaching the hop;
selecting flow parameters for each of the probe packets, wherein selecting the flow parameters for each of the probe packets includes selecting at least some of the flow parameters from the list, obtaining machine type or software version information of the hop, using the machine type or software version information to identify a load sharing algorithm used by the hop, and using the load sharing algorithm to set boundary conditions for selecting the flow parameters for each of the probe packets;
transmitting the number of probe packets to the hop;
receiving responses to the probe packets;
recording network addresses of next hops revealed by the responses; and
generating, from the network addresses of next hops, a network topology map illustrating the network paths.

12. The system of claim 11 wherein selecting the number of probe packets includes performing a lookup in a table that maps the number of expected next hops to the number of probe packets.

13. The system of claim 11 comprising iteratively increasing the number of probe packets, generating and transmitting the increased number of probe packets to the hop, receiving responses to the increased number of probe packets, and recording network addresses of new next hops revealed by the increased number of probe packets.

14. The system of claim 11 wherein selecting the flow parameters includes selecting a combination of parameters that identifies a flow for each of the probe packets.

15. The system of claim 14 wherein the combination of parameters that identify a flow include source address, source port, destination address, destination port, and protocol.

16. The system of claim 13 wherein selecting the parameters that identify a flow for each of the parameters includes varying at least one of the parameters so that at least some of the probe packets are associated with different flows.

17. The system of claim 11 wherein selecting the flow parameters includes identifying a routing characteristic of the hop and selecting the flow parameters based on the routing characteristic of the hop.

18. The system of claim 11 comprising inserting a quality of service tag in the probe packets.

19. The system of claim 11 wherein the network topology map shows a relative frequency of use of the network paths.

20. The system of claim 11 wherein the network topology map shows a packet loss metric associated with the hops.

21. A non-transitory computer readable medium having stored thereon executable instructions that when executed by a processor of a computer control the computer to perform steps comprising:
identifying network paths between a source and a destination, wherein identifying the network paths includes:
for a hop in network topology:
selecting a number of probe packets for revealing an expected number of next hops reachable from the hop;

maintaining a list of flows reaching the hop;
selecting flow parameters for each of the probe packets, wherein selecting the flow parameters for each of the probe packets includes selecting at least some of flow parameters from the list, obtaining machine type or software version information of the hop, using the machine type or software version information to identify a load sharing algorithm used by the hop, and using the load sharing algorithm to set boundary conditions for selecting the flow parameters for each of the probe packets;
generating the number of probe packets and including the selected flow parameters in the probe packets;
transmitting the number of probe packets to the hop;
receiving responses to the probe packets;
recording network addresses of next hops revealed by the responses; and
generating, from the network addresses of next hops, a network topology map illustrating the network paths.

* * * * *